US012659932B2

(12) United States Patent (10) Patent No.: US 12,659,932 B2
Li (45) Date of Patent: Jun. 16, 2026

(54) PAGING METHOD AND APPARATUS FOR CALLED TERMINAL

(71) Applicant: Honor Device Co., Ltd., Shenzhen (CN)

(72) Inventor: Haibo Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 293 days.

(21) Appl. No.: 18/570,009

(22) PCT Filed: Apr. 13, 2023

(86) PCT No.: PCT/CN2023/088185
§ 371 (c)(1),
(2) Date: Dec. 13, 2023

(87) PCT Pub. No.: WO2023/246248
PCT Pub. Date: Dec. 28, 2023

(65) Prior Publication Data
US 2025/0097898 A1 Mar. 20, 2025

(30) Foreign Application Priority Data

Jun. 23, 2022 (CN) ......................... 202210717676.7

(51) Int. Cl.
*H04W 68/02* (2009.01)
*H04L 65/1016* (2022.01)
*H04L 65/1104* (2022.01)
(52) U.S. Cl.
CPC ......... *H04W 68/02* (2013.01); *H04L 65/1016* (2013.01); *H04L 65/1104* (2022.05)
(58) Field of Classification Search
None
See application file for complete search history.

(56) References Cited

U.S. PATENT DOCUMENTS

2018/0317201 A1 11/2018 Cha et al.
2020/0228578 A1 7/2020 Jia
(Continued)

FOREIGN PATENT DOCUMENTS

CN 100563193 C 11/2009
CN 104780108 B 2/2019
(Continued)

OTHER PUBLICATIONS

Ma et al., "Solution to Voice and SMS for 5G Networks," Mobile Communications, vol. 9, 6 pages (Sep. 15, 2018).
(Continued)

*Primary Examiner* — Adolf Dsouza
(74) *Attorney, Agent, or Firm* — Leydig, Voit & Mayer, Ltd.

(57) ABSTRACT

A called terminal device camping on a 5th generation (5G) standalone (SA) network receives a paging message. The called terminal device may start a first timer when detecting that a data radio bearer (DRB) for transmitting Internet Protocol (IP) multimedia subsystem (IMS) data is established, and detect whether IMS data is received in an on period of the first timer. If the first timer expires and the called terminal device does not receive INVITE or other IMS data, it is considered that the network is abnormal and therefore the IMS data (such as INVITE) cannot be received. In this case, the called terminal device may actively fall back to long term evolution (LTE) to receive an incoming call. In this way, the called terminal device can receive an INVITE message or a paging message in an IMS domain on the LTE, thereby avoiding a failed incoming call.

20 Claims, 10 Drawing Sheets

(56)         References Cited

U.S. PATENT DOCUMENTS

| | | | | |
|---|---|---|---|---|
| 2021/0051529 A1* | 2/2021 | Yuan | ........................ | H04W 4/16 |
| 2021/0051530 A1* | 2/2021 | Venkataraman | ...... | H04W 76/12 |
| 2023/0086087 A1* | 3/2023 | Shen | ........................ | H04W 8/24 |
| | | | | 370/328 |
| 2023/0239952 A1 | 7/2023 | Shi et al. | | |
| 2023/0362882 A1 | 11/2023 | Luo et al. | | |
| 2024/0015604 A1 | 1/2024 | Zhang | | |

FOREIGN PATENT DOCUMENTS

| | | | |
|---|---|---|---|
| CN | 109644385 A | 4/2019 |
| CN | 110876169 A | 3/2020 |
| CN | 111372327 A | 7/2020 |
| CN | 113242583 A | 8/2021 |
| CN | 113438679 A | 9/2021 |
| CN | 114051070 A | 2/2022 |
| CN | 114501568 A | 5/2022 |
| CN | 114501683 A | 5/2022 |
| CN | 114585086 A | 6/2022 |
| CN | 114828126 A | 7/2022 |
| WO | 2022072034 A1 | 4/2022 |
| WO | 2022092897 A1 | 5/2022 |

OTHER PUBLICATIONS

Ericsson et al., "Re-organization of IMS specifications to better reflect aspects of interoperability and commonality between IP Multimedia Systems using different IP-Connectivity Access Networks," 3GPP TSG-SA2 Meeting #30, S2-030883, Milan, Italy, 134 pages (Feb. 24-28, 2003).

Huawei, "Clarifications and Corrections on N1 Message Transfer and Failure Notification of Paging," 3GPP TSG CT4 Meeting #84, C4-183356, KunMing, P.R. China, 10 pages (Apr. 16-20, 2018).

Huawei et al., "EPS fallback enhancements in Rel-17," 3GPP TSG-RAN WG2 Meeting #117-e, R2-2202818, Online, 22 pages (Feb. 21-Mar. 3, 2022).

3GPP TS 24.229 V16.10.0, (Jun. 2021), "3rd Generation Partnership Project; Technical Specification Group Core. Network and Terminals; IP multimedia call control protocol based on Session Initiation Protocol (SIP) and Session. Description Protocol (SDP); Stage 3 (Release 16)," pp. 1-1065 (Jun. 25, 2021).

* cited by examiner

Terminal device 100

PAGING METHOD AND APPARATUS FOR CALLED TERMINAL

CROSS-REFERENCE TO RELATED APPLICATIONS

This application is a national stage of International Application No. PCT/CN2023/088185, filed on Apr. 13, 2023, which claims priority to Chinese Patent Application No. 202210717676.7, filed on Jun. 23, 2022. The disclosures of both of the aforementioned applications are hereby incorporated by reference in their entireties.

TECHNICAL FIELD

This application relates to the communication field, and in particular, to a paging method and apparatus for a called terminal.

BACKGROUND

Currently, a 5th generation mobile communication system (5G) standalone (SA) network is being widely popularized. However, the SA network is not mature. A failure in connection (failed incoming call) may occur when a user enables and uses an SA function of a terminal device.

In the SA network, only an IP (Internet Protocol) multimedia subsystem (IMS) domain exists, and no circuit switching (CS) domain exists. When an IMS link is abnormal, although a CS domain retry may be initiated on a network side (that is, fallback to the CS domain for paging the terminal device), since the terminal device is not registered with the CS domain, the terminal device cannot fall back to the CS domain to receive an incoming call, causing a failed incoming call.

When the network fault causes an abnormality in an evolved packet system fallback (EPS Fallback) voice bearing process, the terminal device cannot fall back to a long term evolution (LTE) network normally. In this case, the terminal device cannot connect to the call normally, resulting in a failed incoming call.

SUMMARY

Embodiments of this application provide a paging method and apparatus for a called terminal, which can resolve a failed incoming call in an SA network.

In a first aspect, an embodiment of this application provides a paging method for a called terminal, including: receiving, by a called terminal device, a paging message, where the called terminal device camps on a 5th generation mobile communication system standalone 5G SA network; starting, by the called terminal device, a first timer when detecting that a data radio bearer DRB for transmitting the IMS data is established, and detecting whether internet protocol multimedia subsystem IMS data is received in an on period of the first timer; and performing, by the called terminal device, fallback to a long term evolution LTE network to receive an incoming call when the first timer expires and the called terminal device does not receive the IMS data.

In the method provided in this embodiment of this application, the called terminal device may start the first timer when detecting that the DRB for transmitting the IMS data is established, and detect whether the IMS data is received in the on period of the first timer. If the first timer expires and the called terminal device does not receive INVITE or other IMS data, it is considered that the network is abnormal and therefore the IMS data (such as INVITE) cannot be received. In this case, the called terminal device may actively fall back to LTE to receive an incoming call. In this way, the called terminal device can receive an INVITE message or a paging message on the LTE, thereby avoiding a failed incoming call.

In a possible implementation, the method further includes: starting a second timer and receiving the incoming call in an on period of the second timer after the called terminal device falls back to the LTE network; and when the incoming call is received in the on period of the second timer, returning to the 5G SA network and reducing a priority of a source cell of the called terminal device after the incoming call ends.

In this way, the called terminal device can receive the incoming call on the LTE in the on period of the second timer. If the called terminal device receives the incoming call in the on period of the second timer, it is considered that the fallback to the LTE implements effective answering of the incoming call. After the call ends, the called terminal device may actively return to NR. A priority of a source NR cell may be reduced after the called terminal device returns to an NR network, to avoid a failed incoming call caused by network abnormalities occurred again in an access network and a core network.

In a possible implementation, the receiving the incoming call in an on period of the second timer includes: receiving, by the called terminal device, any one of a paging message, an invitation INVITE message, or a session initiation protocol SIP call establishment message in an IMS domain in the on period of the second timer; or receiving, by the called terminal device, any one of a paging message or a CS service notification message in a circuit switching CS domain in the on period of the second timer. That is to say, the called terminal device can receive the incoming call in the IMS domain or the CS domain after falling back to the LTE, thereby avoiding a failed incoming call.

In a possible implementation, the method further includes: performing a circuit switched fallback (CSFB) process to switch to the CS domain after the called terminal device receives the CS paging message on the LTE. That is to say, the called terminal device can be switched to the CS domain to receive the incoming call after falling back to the LTE, thereby avoiding a failed incoming call.

In a possible implementation, the method further includes: calculating, by the called terminal device, a success rate of receiving the incoming call after falling back to the LTE for N times within each preset cycle; performing, by the called terminal device, fallback to the LTE network to receive the incoming call when the success rate is greater than or equal to a preset threshold and the called terminal device does not receive the IMS data of the called terminal device when the first timer expires again; and skipping performing, by the called terminal device, fallback to the LTE network to receive the incoming call when the success rate is less than the preset threshold and the called terminal device does not receive the IMS data of the called terminal device when the first timer expires again. In this way, a case in which the called terminal device falls back to the LTE a plurality of times but ineffectively receives the incoming call within each preset cycle can be avoided.

In a possible implementation, the performing, by the called terminal device, fallback to a long term evolution LTE network to receive an incoming call includes: performing, by the called terminal device, fallback to the LTE to receive the incoming call when a preset condition is satisfied. The preset condition includes that the called terminal device does not open a preset application, the called terminal device does not enable a game mode or a performance mode, and/or the called terminal device is in a screen off state. It should be understood that, when the preset condition is satisfied, that is, when the preset application is not opened, the game mode or the performance mode is not enabled, and/or the called terminal device is in the screen off state, requirements on network quality and a data transmission rate are not high, and the called terminal device may camp on a low level network (such as a 4G network) to provide services to users.

In a possible implementation, in the on period of the first timer, the called terminal device disables the first timer when receiving the IMS data of the called terminal device. The called terminal device may interact with a network side based on the IMS data received from the IMS DRB without a need to fall back to the LTE network.

In a possible implementation, a duration of the second timer is configurable based on a preset parameter. The preset parameter includes at least one of a parameter indicating that the called terminal device is in a screen on state or a screen off state, a network type of the called terminal device set by a user, a parameter indicating whether the called terminal device is connected to a Wi-Fi network, an operating mode of the called terminal device, a current traffic used by the called terminal device, and a number of applications simultaneously run on the called terminal device.

It should be noted that, when the called terminal device is in the screen off state, the called terminal device usually has few interactions with the network, and has low requirements on the network quality and the data transmission rate, and may camp on a low level network (such as the LTE network) for a long time. This does not affect normal operation of the called terminal device, and can increase a call completion of the called terminal device. When the called terminal device uses a Wi-Fi network, the called terminal device usually has few interactions with a mobile communication network, and may camp on a low level network (such as the LTE network) for a long time. This does not affect the normal operation of the called terminal device, and can increase the call completion of the called terminal device. When it is detected that a user turns on a 5G network switch, it indicates that the user prefers the called terminal device to camp on a 5G network. In this case, the called terminal device may camp on a low level network (such as the LTE network) for a relatively short time. This does not affect the normal operation of the called terminal device. When the called terminal device needs to consume a large amount of traffic of a mobile communication network, the called terminal device may camp on a low level network (such as a 4G network) for a relatively short time, but needs to return to a higher level network as soon as possible, so as to avoid impact on the normal operation of the called terminal device.

In a second aspect, this application provides a computer program product. When the computer program product is run on a computer, the computer is caused to perform the method in the first aspect and any possible design thereof.

In a third aspect, this application provides a computer-readable storage medium. The computer-readable storage medium includes computer instructions. When the computer instructions are run on a called terminal device (such as a mobile phone), the called terminal device is caused to perform the method in the first aspect and any possible implementation thereof.

In a fourth aspect, an embodiment of this application provides a paging apparatus for a called terminal, including a processor. The processor is coupled to a memory. The memory is configured to store program instructions which. When the program instructions stored in the memory are executed by the processor, the apparatus is caused to implement the method in the second aspect or any possible design thereof. The apparatus may be a called terminal device, or may be a component of the called terminal device, such as a chip.

In a fifth aspect, this application provides a chip system. The chip system includes one or more interface circuits and one or more processors. The interface circuits and the processors are connected to each other through lines.

The chip system is applicable to a called terminal device including a communication module and a memory. The interface circuit is configured to receive a signal from the memory of a first terminal device and send the signal to the processors. The signal includes computer instructions stored in the memory. When the processor executes the computer instructions, the called terminal device may perform the method in the second aspect and any possible design thereof.

It may be understood that, for beneficial effects that can be achieved by the computer program product in the second aspect, the computer-readable storage medium in the third aspect, the paging apparatus for a called terminal in the fourth aspect, and the chip system in the fifth aspect provided above, reference may be made to beneficial effects in the first aspect and any possible design thereof. Details are not described herein.

DESCRIPTION OF EMBODIMENTS

For clarity and brevity of the following embodiments, related concepts or technologies are briefly described first.

IMS: It is a new multimedia service form, which can meet demands of current terminal users for more innovative and diverse multimedia services. For example, IMS messages can implement exchange of various types of multimedia content such as images, videos, and audios.

Packet switch (PS): It is a communication manner in which both communication parties exchange data by using a storage-forward mechanism by using a packet as a unit. Data during communication between users may be divided into a plurality of small data segments having an equal length. Necessary control information is added to each of the data segments as a header of the data segment. Each data segment with the header forms a packet. The header indicates an address to which the packet is to be sent. After receiving the packet, a switch may forward the packet to a destination based on the address information in the header. This process is packet switch. Packet switch actually means storage and forwarding. In this process, a received packet is temporarily stored, and waits for router toward a destination direction. When allowed, the information may be sent to a corresponding router to complete forwarding. The storage and forwarding process is a packet switch process.

CS: A full name thereof is circuit switching. When a call is initiated through a CS network, the CS network can allocate a fixed channel for both parties involved in the call. When the call ends, the CS network can release the channel for allocation to other users to make a call. In short, circuit switch means connecting to a "dedicated" circuit when a call is established and cutting off the connection from the "dedicated" circuit when the call ends.

Session initiation protocol (SIP): An SIP is an application layer protocol that can be used to establish, modify, and release multimedia sessions in an IP network. SIP applications mainly include but are not limited to voice, messaging, videos, call control, and the like. Frequently used SIP request messages may include INVITE (for establishing a session for exchanging media with a user agent) and ACK (for a client to confirm receipt of a final response to the INVITE request to a server).

However, a failure in connection (failed incoming call) may occur when a terminal device camps on in an SA network.

Figure 1:
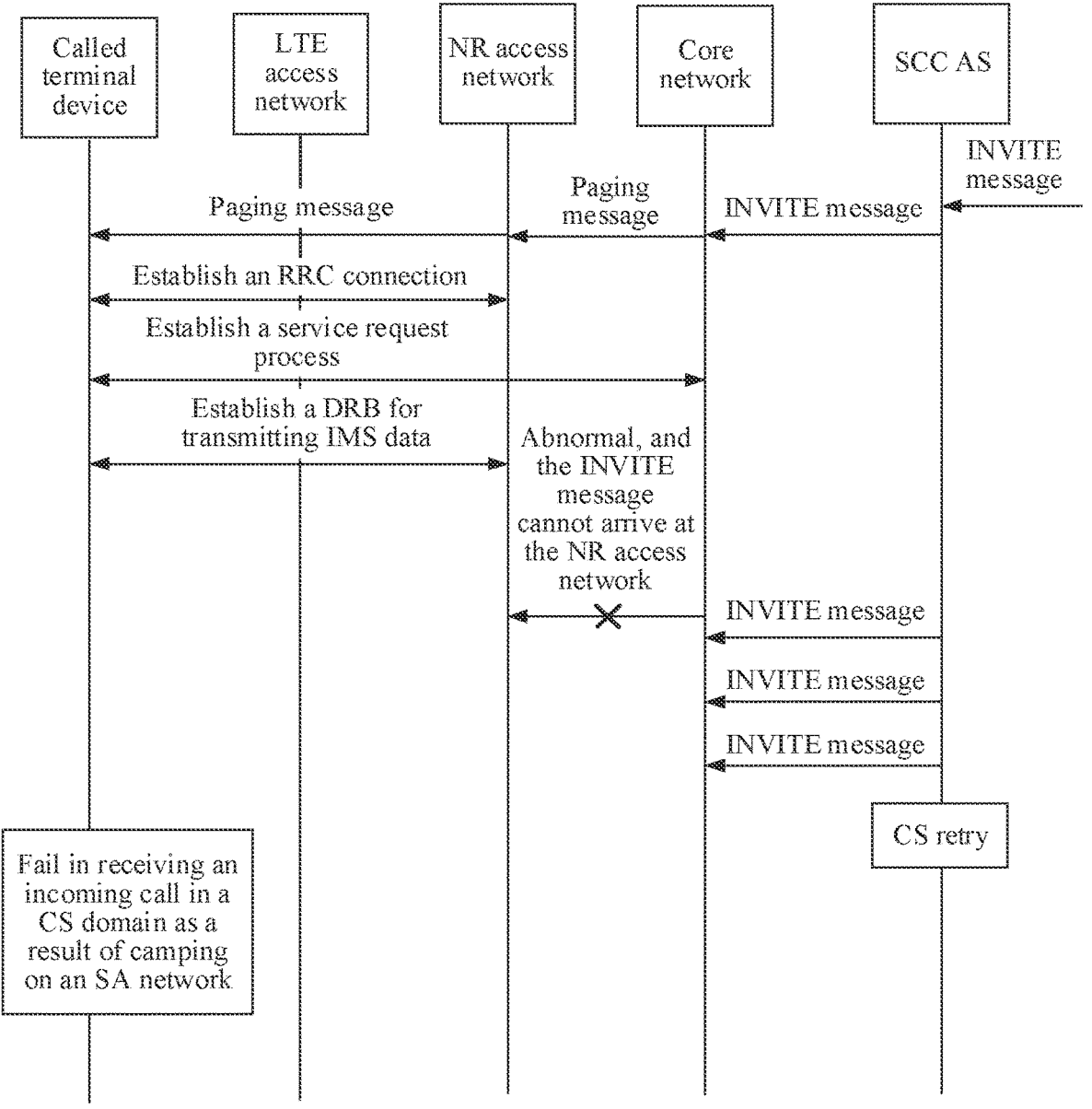
FIG. 1 is a schematic signal exchange diagram I according to an embodiment of this application.

For example, as shown in FIG. 1, an SCC AS may send an INVITE message to a core network after receiving the INVITE message. The core network may send a paging message to an NR access network. The NR access network may send the paging message to a called terminal device. The called terminal device in an idle state may establish an RRC connection to the NR access network after receiving the paging message. The called terminal device may establish a service request process with the core network. The NR access network may configure/establish a data radio bearer (DRB) for transmitting IMS data for the called terminal device. However, due to a network fault (for example, an abnormality occurs in an initial context setup process between an access and mobility management function (AMF) unit and the New Radio (NR) access network), the core network fails in sending the INVITE message (or another IMS signaling) to the NR access network. As a result, the called terminal device cannot receive the INVITE message. The SCC AS may retransmit the INVITE message 3 times (for example, at a retry interval of 0.5 s, 1 s, 2 s, or 4 s). If still failing, the SCC AS may initiate a CS retry. However, since the called terminal device operates in the SA network and is registered with only an IMS domain and not registered with a CS domain, the called terminal device cannot receive paging from the CS domain, resulting in a failed incoming call.

Figure 2:
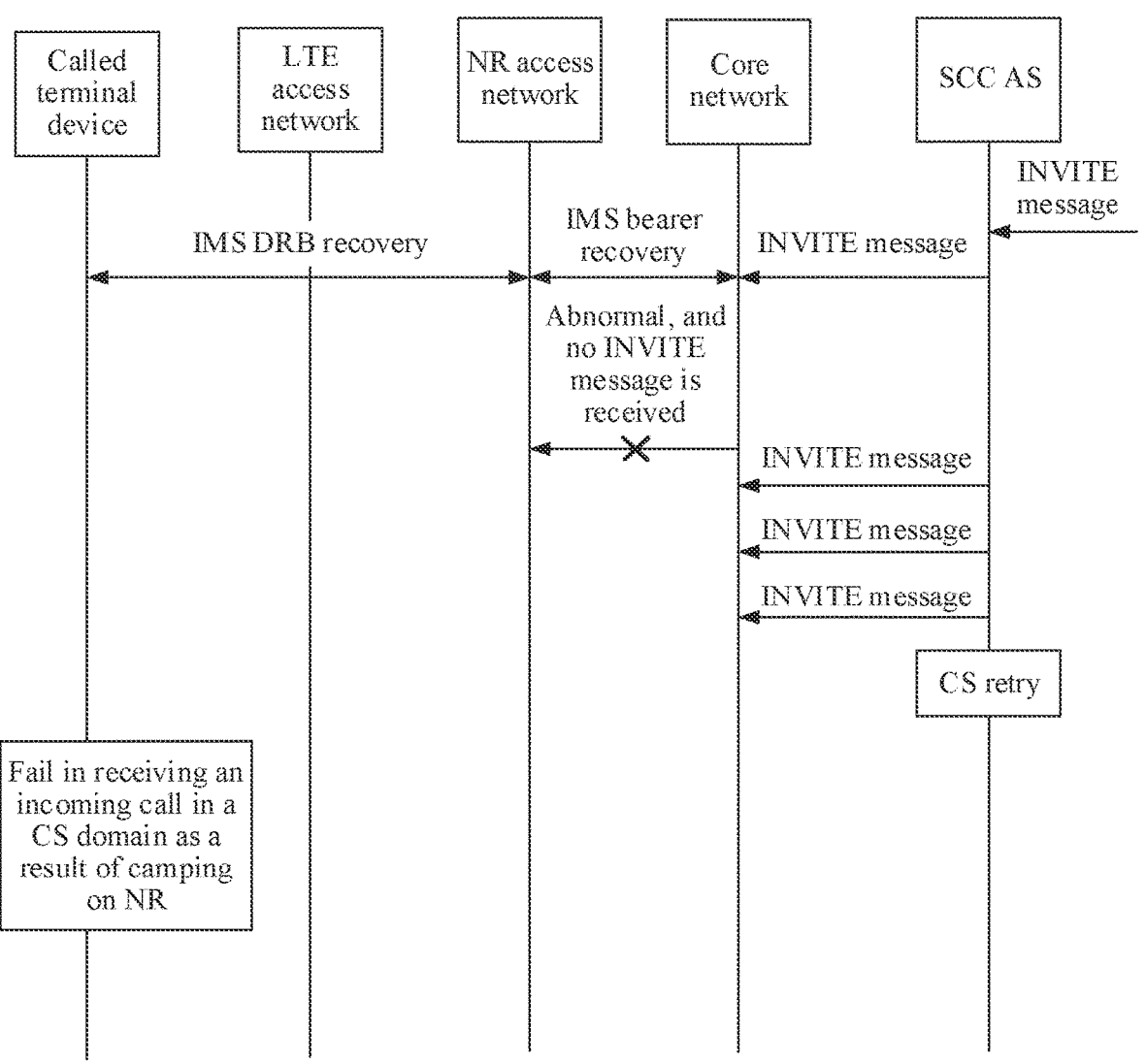
FIG. 2 is a schematic signal exchange diagram II of according to an embodiment of this application.

For example, as shown in FIG. 2, SCC AS may send the INVITE message to the core network after receiving the INVITE message. If the called terminal device is in a connected state, the core network may recover an IMS bearer with the NR access network, and the NR access network may recover/establish the DRB for transmitting the IMS data with the called terminal device. However, due to a network fault (for example, an abnormality occurs in an initial context setup process between the AMF element of the core network and a base station), the core network fails in sending the INVITE message (or another IMS signaling) to the NR access network. As a result, the called terminal device cannot receive the INVITE message. The SCC AS may retransmit the INVITE message 3 times, and then the SCC AS may initiate a CS retry. However, since the called terminal device operates in the SA network and is registered with only an IMS domain and not registered with a CS domain, the called terminal device cannot receive paging from the CS domain, resulting in a failed incoming call.

An embodiment of this application provides a paging method for a called terminal. When detecting that the DRB for transmitting the IMS data is established or recovered, the called terminal device may start a timer T1 (a first timer), and detect whether the IMS data of the called terminal device is received in an on period of the timer T1. When the timer T1 expires and the called terminal device does not receive the INVITE or the IMS data, the called terminal device falls back to LTE to receive an incoming call. Since the called terminal device falls back to the LTE, the called terminal device can receive the INVITE message in the IMS domain on the LTE, or may perform a CSFB process to smoothly switch an IMS voice anchored in the IMS domain to the CS network. In this way, the called terminal device can receive the paging from the CS domain, so that the called terminal device can receive the incoming call, thereby avoiding a failed incoming call.

Figure 3:
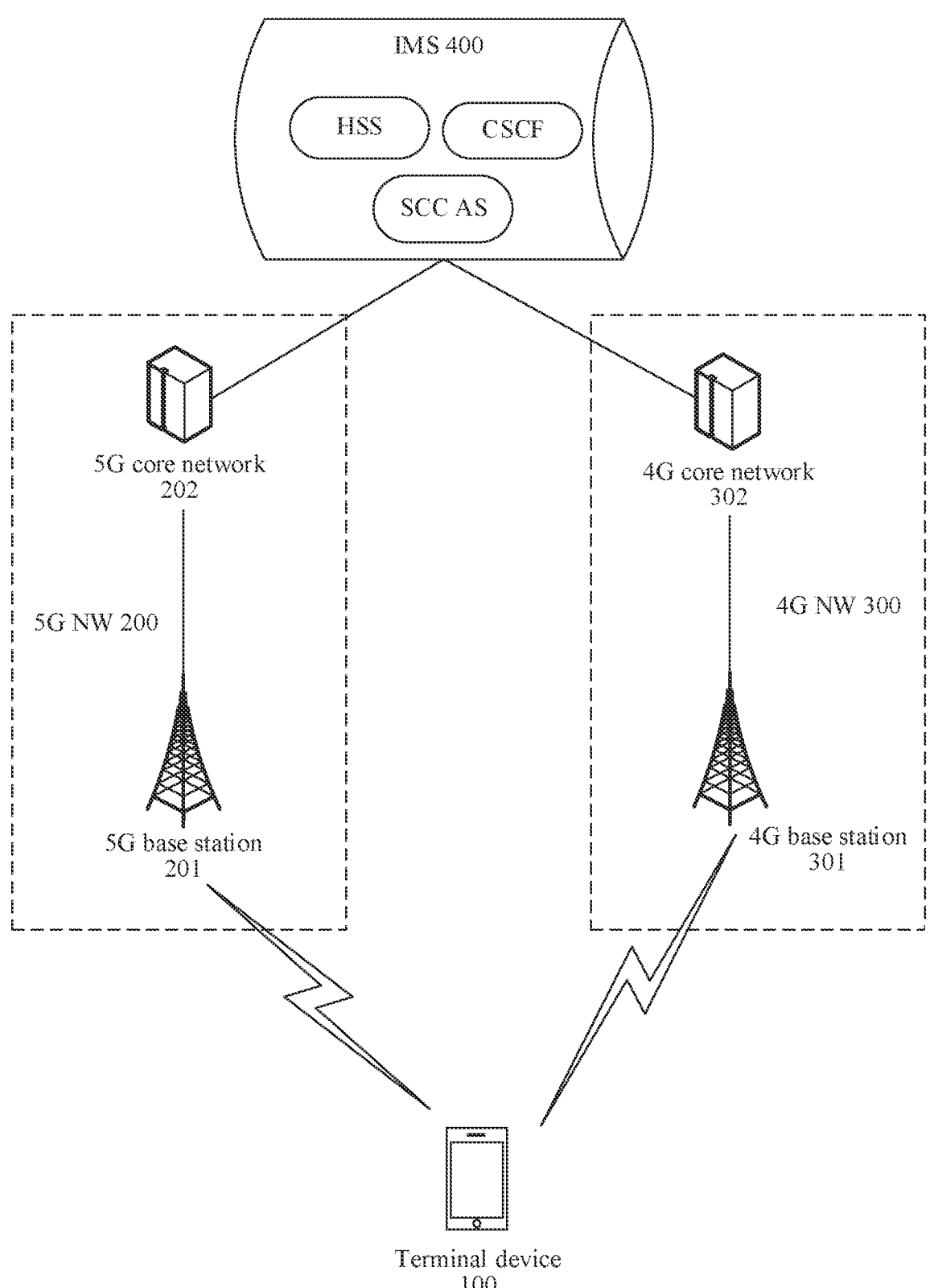
FIG. 3 is a schematic diagram of a system architecture according to an embodiment of this application.

FIG. 3 is a schematic diagram of a communication system to which the technical solutions provided in the embodiments of this application are applicable. The communication system may include a terminal device 100, 5G NW 200, 4G NW 300, and an IMS 400.

The terminal device 100 may be a caller terminal device (or a caller side terminal device) or a called side terminal device (or a called side terminal device). The terminal device 100 may include a smart phone (for example, a mobile phone carrying an Android system or an iOS system), a tablet computer, a notebook computer, a palm computer, a mobile internet device (MID), a wearable device (for example, a smart watch or a smart band), or another device that can connect to the internet. In this embodiment of this application, the terminal side device may be an independently sold terminal or a chip in the terminal. In the technical solutions provided in this embodiment of this application, the terminal side device is an apparatus configured to implement a function of a terminal, for example.

User information is stored in the terminal device 100. The user information may include an international mobile subscriber identification number (IMSI). The IMSI may be stored in a subscriber identity module (SIM) card of the terminal device 100. The terminal device 100 may use the user information as an identity identifier to initiate or receive a call through various voice solutions.

The 5G NW 200 is deployed as a standalone (SA) network. The 5G NW 200 may include a 5G base station 201 and a 5G core network (5GC) 202. The 5G base station 201 is connected to the 5G core network 202. The 5G core network 202 is connected to the IMS 400.

The 5G base station 201 may be a next generation NodeB (gNB). The gNB may be connected to the terminal device 100, and may communicate with the terminal device 100 through a 5G NR access technology. That is to say, the gNB communicates with the terminal device 100 through an NR link.

The 5G core network 202 is configured for exchanging, forwarding, assembly, and routing of data. Network elements in the 5G core network 202 are virtual functional units, which may include but are not limited to: AMF, a session management function (SMF) unit, and a unified data management (UDM) unit.

The 4G NW 300 may include a 4G base station 301 and a 4G core network (evolved packet core, EPC) 302. The 4G base station 301 is connected to the 4G core network 302. The 4G core network 302 is connected to the IMS 400.

The 4G base station 301 may be an evolved NodeB (eNB).

The 4G core network 302 mainly includes the following network elements: a mobility management entity (MME), a serving gateway (SGW), a packet data network gateway (PGW), a home subscriber server (HSS), an application server (AS), and the like. Main functions of the MME include access control, mobility management, attachment and detachment, session management (such as establishment, modification, and release of a bearer), and the like. The SGW is mainly configured for routing and forwarding of a data packet. Main functions of the PGW include a user-based packet filtering function, a lawful listening function, an IP address assignment function, and the like. The HSS is configured to store user subscription information, user subscription data, mobile user location information, and the like.

The IMS 400 may include a service centralization and continuity application server (SCC AS). The SCC AS can perform a terminating-access domain selection (T-ADS) function to determine access domain information of a called user. The IMS 400 may further include a call session control function (CSCF) entity and a home subscriber server (HSS). The CSCF is configured to control signaling and authentication in a multimedia call session, and cooperate with another network entity to control the session. The HSS is configured to manage user data.

It may be understood that, the units shown in FIG. 3 do not constitute a specific limitation on the communication system. The communication system may further include more or fewer units than those shown in the figure, or some units may be combined, or some units may be split, or the units may be arranged in different manners. This is not limited in this application.

Figure 4:
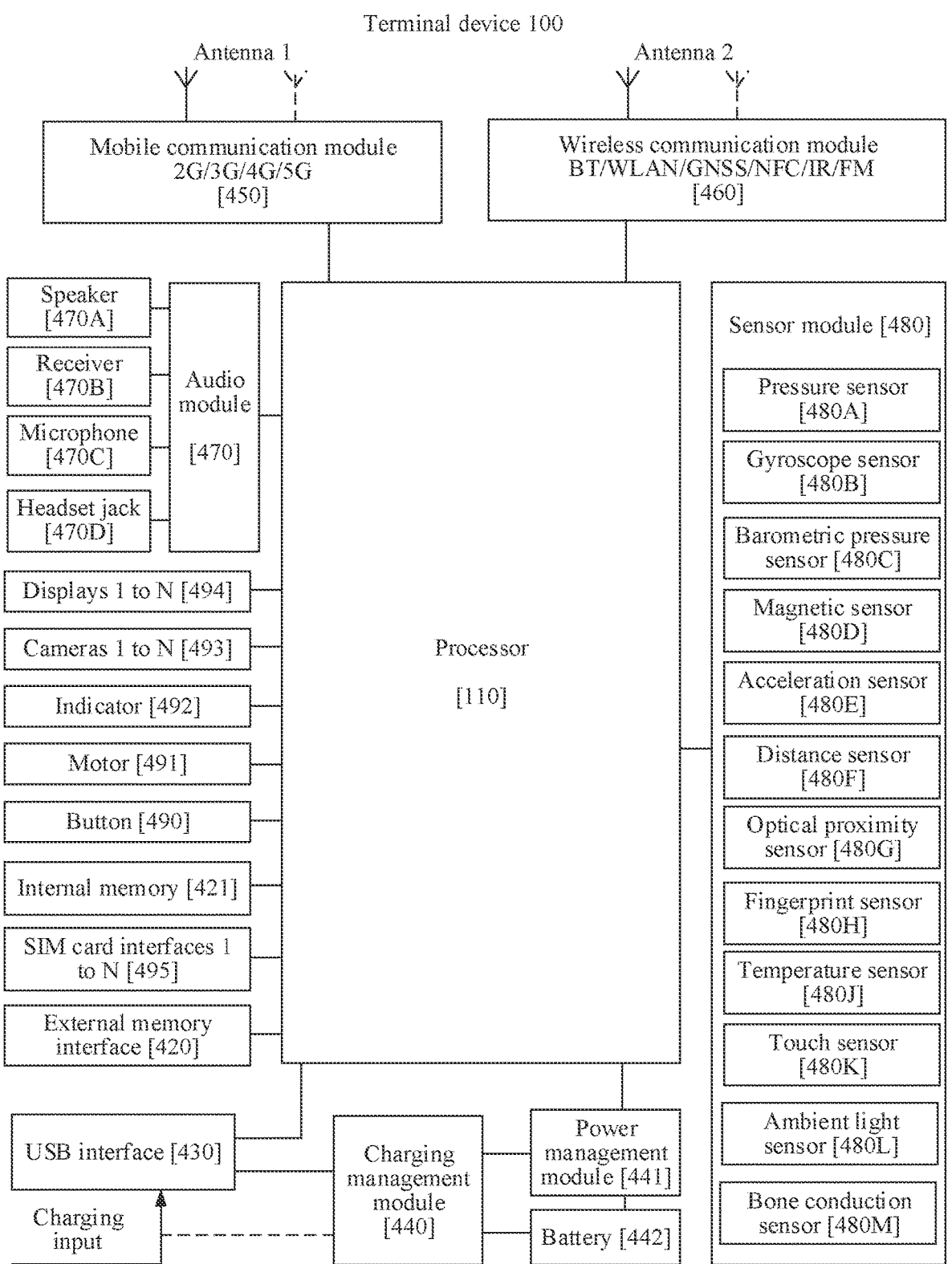
FIG. 4 is a schematic diagram of a hardware structure of a terminal device according to an embodiment of this application.

FIG. 4 is a schematic structural diagram of a terminal device 100 according to an embodiment of this application. The terminal device 100 may be a first electronic device. As shown in FIG. 4, the terminal device 100 may include a processor 410, an external memory interface 420, an internal memory 421, a universal serial bus (USB) interface 430, a charging management module 440, a power management module 441, a battery 442, an antenna 1, an antenna 2, a mobile communication module 450, a wireless communication module 460, an audio module 470, a speaker 470A, a receiver 470B, a microphone 470C, a headset jack 470D, a sensor module 480, a button 490, a motor 491, an indicator 492, a camera 493, a display 494, a subscriber identity module (SIM) card interface 495, and the like. The sensor module 480 may include a pressure sensor 480A, a gyroscope sensor 480B, a barometric pressure sensor 480C, a magnetic sensor 480D, an acceleration sensor 480E, a distance sensor 480F, an optical proximity sensor 480G, a fingerprint sensor 480H, a temperature sensor 480J, a touch sensor 480K, an ambient light sensor 480L, a bone conduction sensor 480M, and the like.

The processor 410 may include one or more processing units. For example, the processor 410 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors.

The controller may be a nerve center and command center of the terminal device 100. The controller may generate an operation control signal based on an instruction operation code and a timing signal, to control instruction fetch and instruction execution.

A memory may be further arranged in the processor 410 to store instructions and data. In some embodiments, the memory in the processor 410 is a cache. The memory may store instructions or data recently used or repeatedly used by the processor 410. If the processor 410 needs to use the instructions or the data again, the processor may directly invoke the instructions or the data from the memory. This avoids repeated access, and reduces a waiting time of the processor 410, and therefore improves system efficiency.

The charging management module 440 is configured to receive a charging input from a charger. The charger may be a wireless charger or a wired charger. In some embodiments of wired charging, the charging management module 440 may receive a charging input of the wired charger through the USB interface 430. In some embodiments of wireless charging, the charging management module 440 may receive a wireless charging input by using a wireless charging coil of the terminal device 100. The charging management module 440 may further supply power to the electronic device through the power management module 441 while charging the battery 442.

The power management module 441 is configured to be connected to the battery 442, the charging management module 440, and the processor 410. The power management module 441 receives an input from the battery 442 and/or the charging management module 440, to supply power to the processor 410, the internal memory 421, the external memory, the display 494, the camera 493, the wireless communication module 460, and the like. The power management module 441 may be further configured to monitor parameters such as a battery capacity, battery recycling times, and a battery health status (leakage and impedance). In some other embodiments, the power management module 441 may be arranged in the processor 410. In some other embodiments, the power management module 441 and the charging management module 440 may be arranged in a same device.

A wireless communication function of the terminal device 100 may be implemented by using the antenna 1, the antenna 2, the mobile communication module 450, the wireless communication module 460, the modem processor, the baseband processor, and the like.

The antenna 1 and the antenna 2 are configured to transmit and receive an electromagnetic wave signal. Each antenna in the terminal device 100 may be configured to cover a single communication frequency band or a plurality of communication frequency bands. Different antennas may be multiplexed to improve utilization of the antennas. For example, the antenna 1 may be multiplexed into a diversity antenna of a wireless local area network. In some other embodiments, the antennas may be used with a tuning switch.

The mobile communication module 450 may provide a wireless communication solution applicable to the terminal device 100, including 2G/3G/4G/5G and the like. The mobile communication module 450 may include at least one filter, a switch, a power amplifier, a low noise amplifier (LNA), and the like. The mobile communication module 450 may receive an electromagnetic wave by using the antenna 1, perform processing such as filtering and amplification on the received electromagnetic wave, and send the electromagnetic wave to the modem processor for demodulation. The mobile communication module 450 may further amplify a signal modulated by the modem processor, and convert the signal into an electromagnetic wave by using the antenna 1 for radiation. In some embodiments, at least some functional modules of the mobile communication module 450 may be arranged in the processor 410. In some embodiments, at least some functional modules of the mobile communication module 450 may be arranged in a same device as at least some modules of the processor 410.

The wireless communication module 460 may provide a wireless communication solution applicable to the terminal device 100, including a wireless local area network (WLAN) (such as a wireless fidelity (Wi-Fi) network), Bluetooth (BT), a global navigation satellite system (GNSS), frequency modulation (FM), a near field communication (NFC) technology, an infrared (IR) technology, and the like. The wireless communication module 460 may be one or more devices into which at least one communication processing module is integrated. The wireless communication module 460 receives an electromagnetic wave by using the antenna 2, performs frequency modulation and filtering on the electromagnetic wave signal, and sends a processed signal to the processor 410. The wireless communication module 460 may further receive a to-be-sent signal from the processor 410, perform frequency modulation and amplification on the to-be-sent signal, and convert the signal into an electromagnetic wave by using the antenna 2 for radiation.

In some embodiments, in the terminal device 100, the antenna 1 is coupled to the mobile communication module 450, and the antenna 2 is coupled to the wireless communication module 460, so that the terminal device 100 can communicate with a network and another device by using a wireless communication technology. The wireless communication technology may include a global system for mobile communication (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a Beidou navigation satellite system (BDS), a quasi-zenith satellite system (QZSS) and/or a satellite-based augmentation system (SBAS).

The terminal device 100 implements a display function by using the GPU, the display 494, the application processor, and the like. The GPU is a microprocessor for image processing, and is connected to the display 494 and the application processor. The GPU is configured to perform mathematical and geometric calculations and graphics rendering. The processor 410 may include one or more GPUs, and execute program instructions to generate or change display information.

The display 494 is configured to display an image, a video, and the like.

The display 494 includes a display panel. The display panel may be a liquid crystal display (LCD), an organic light-emitting diode (OLED), an active-matrix organic light emitting diode (AMOLED), a flexible light-emitting diode (FLED), a miniLED, a microLED, a micro-OLED, A quantum dot light emitting diode (QLED), and the like.

The terminal device 100 may implement a photographing function by using the ISP, the camera 493, the video codec, the GPU, the display 494, the application processor, and the like.

The terminal device 100 may implement an audio function, for example, music playback and calculating, by using the audio module 470, the speaker 470A, the receiver 470B, the microphone 470C, the headset jack 470D, the application processor, and the like.

The SIM card interface 495 is configured to connect a SIM card. The SIM card may be inserted into the SIM card interface 495 or removed from the SIM card interface 495 to connect the SIM card to or to remove the SIM card from the terminal device 100. The terminal device 100 may support 1 or N SIM card interfaces. N is a positive integer greater than 1. The SIM card interface 495 can support a Nano SIM card, a micro SIM card, a SIM card, and the like. A plurality of cards may be inserted into a same SIM card interface 495 simultaneously. The plurality of cards may be of a same type or different types. The SIM card interface 495 may be further compatible with different types of SIM cards. The SIM card interface 495 may be further compatible with an external memory card. The terminal device 100 interacts with a network by using the SIM card, to implement a call function, a data communication function, and the like. In some embodiments, the terminal device 100 uses an eSIM, that is, an embedded SIM card. The eSIM card may be embedded in the terminal device 100, and cannot be separated from the terminal device 100.

Methods in the following embodiments may all be implemented in the terminal device 100 having the foregoing hardware structure.

It may be understood that the structure shown in this embodiment does not constitute a specific limitation on the terminal device 100. In some other embodiments, the terminal device 100 may include more or fewer components than those shown in the figure, or some components may be combined, or some components may be split, or components may be arranged in different manners. The components in the figure may be implemented by hardware, software, or a combination of software and hardware. For example, the terminal device 100 may further include auxiliary devices such as a mouse, a keyboard, and a drawing board for creating, transmitting, receiving, and customizing target emojis.

Technical solutions in embodiments of this application are described below with reference to the drawings in the embodiments of this application. In the description of this application, unless otherwise specified, "at least one" indicates one or more, and "a plurality of" indicates two or more. Moreover, to clearly describe the technical solutions in the embodiments of this application, in the embodiments of this application, terms such as "first" and "second" are used to define same items or similar items whose functions and effects are substantially the same. A person skilled in the art may understand that the terms such as "first" and "second" do not limit a quantity and an execution order, and the terms such as "first" and "second" unnecessarily define a difference.

For ease of understanding, the paging method for a called terminal provided in the embodiments of this application is described below in detail with reference to the drawings.

Figure 5A:
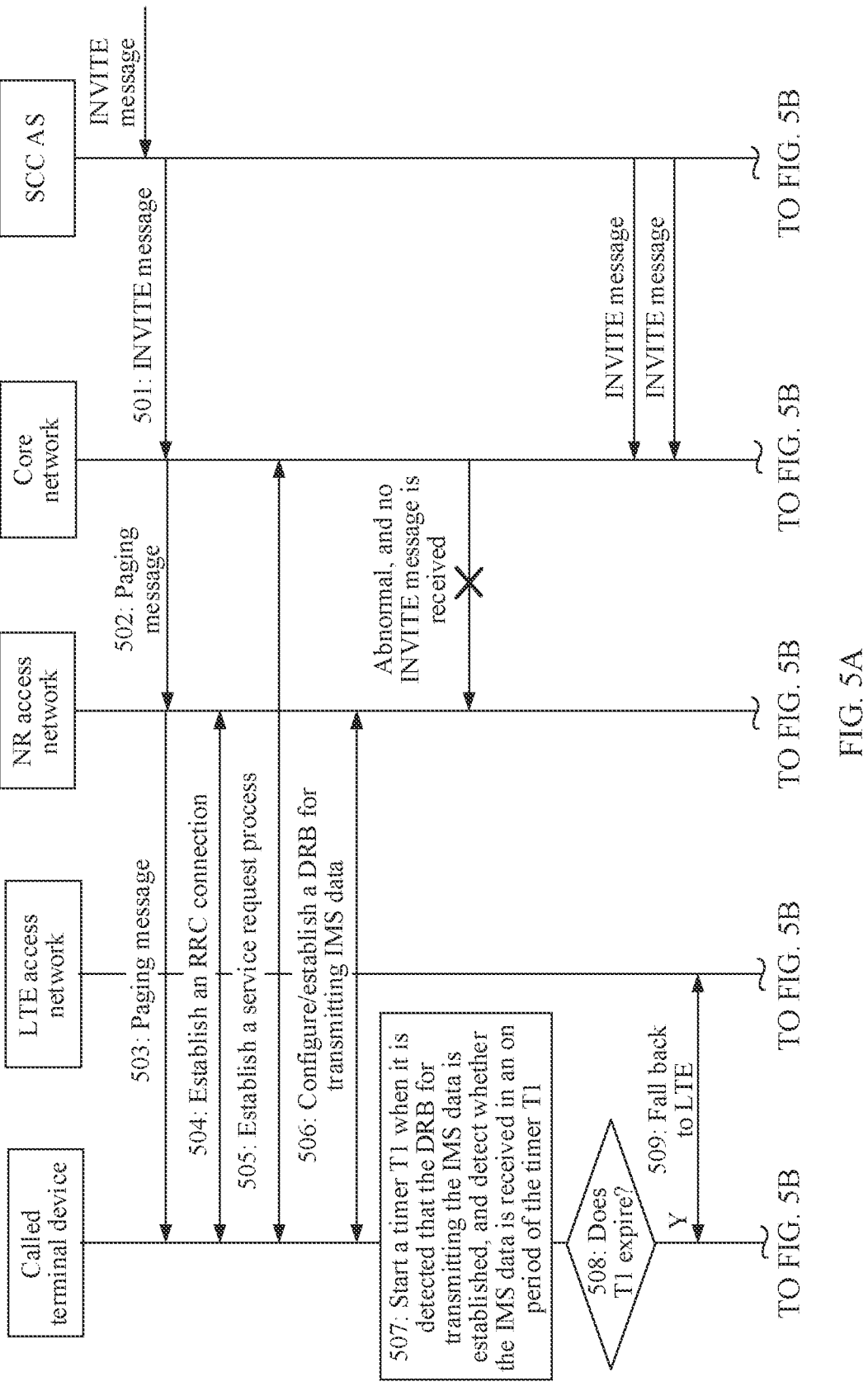
FIG. 5A and FIG. 5B are schematic signal exchange diagrams III according to an embodiment of this application.
Figure 5B:
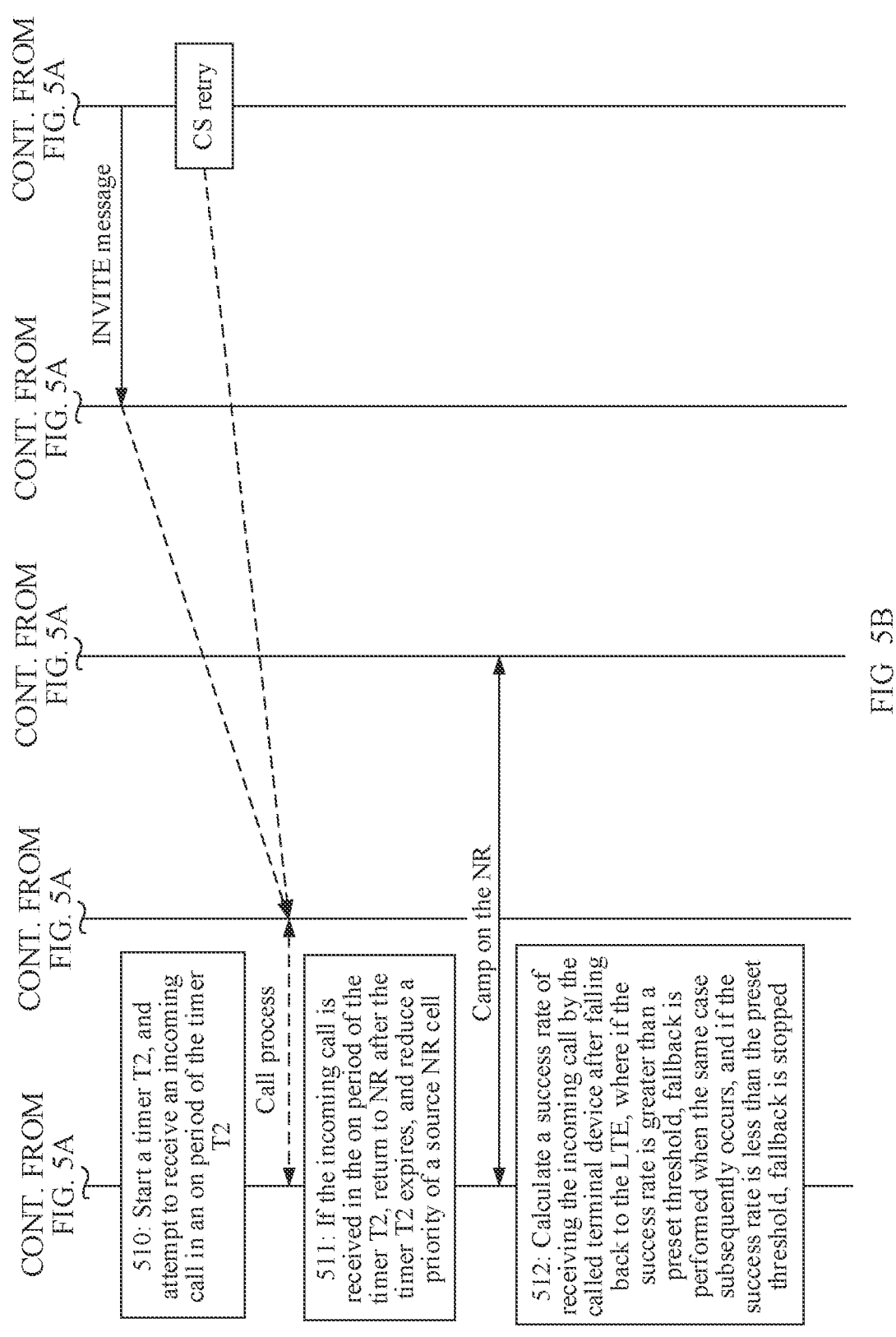

As shown in FIG. 5A and FIG. 5B, an embodiment of this application provides a paging method for a called terminal. A called terminal device is in an idle state, for example. The method includes the following steps:

501: An SCC AS receives an INVITE message and then sends the INVITE message to a core network.

It may be understood that, in response to a user operation, a caller terminal device may initiate a call. The caller terminal device may send a call request message (such as an INVITE message) through a caller side network (a network with which the caller terminal device is registered). The INVITE message can arrive at the SCC AS. After receiving the INVITE message, the SCC AS may perform T-ADS domain selection, and determines that a called terminal device is in an IMS domain. Then, the SCC AS may send the INVITE message to the core network (such as an NR core network) corresponding to the called terminal device through a CSCF.

502: The core network sends a paging message to an NR access network.

The core network determines the NR access network corresponding to the called terminal device, and then sends the paging message to the NR access network.

503: The NR access network sends the paging message to the called terminal device.

504: The called terminal device receives the paging message and then establishes an RRC connection to the NR access network.

505: The called terminal device performs a service request procedure with the NR access network.

The service request procedure means that when the UE has new to-be-sent uplink data or learns that the network has to-be-sent downlink data, the UE may send a service request packet to the core network to establish an evolved packet system (EPS) connection management (ECM) connection. The network side may return service accept to the terminal device.

506: The NR access network configures/establishes a DRB for transmitting IMS data with the called terminal device.

The core network may establish the radio access bearer (RAB) establishment after receiving the service request message from the UE. The core network may send an initial context setup request (Initial Context Setup Request) message to a gNB, so that the gNB may establish the DRB for transmitting the IMS data with the called terminal device.

The called terminal device may monitor whether the DRB for transmitting the IMS data (IMS DRB, for short) is established after being successfully registered with an IMS. It may be understood that the IMS data is user side data and may be carried in the DRB.

507: The called terminal device may start a timer T1 when detecting that the DRB for transmitting the IMS data is established, and detect whether the IMS data is received in an on period of the timer T1.

If the called terminal device detects the IMS DRB is established on the NR, it means that the called terminal paging (MT paging) requires transmission of the IMS data (that is, the network needs to transmit the IMS data to the called terminal device). In this case, the called terminal device may start the timer T1 and detect whether data is received from the IMS DRB in the on period of the timer T1.

508: Determine whether the timer T1 expires.

If the timer T1 expires, step 509 is performed.

If the timer T1 expires, that is, the called terminal device receives the data from the IMS DRB in the on period of the timer T1, and the received data is greater than a preset threshold, the timer T1 may be disabled. The called terminal device may interact with the network side based on the IMS data received from the IMS DRB.

509: When the timer T1 expires and the called terminal device does not receive INVITE or other IMS data (for example, multimedia data such as an audio, a text, an image, and a video), it is considered that the network is abnormal and therefore the IMS data (such as INVITE) cannot be received, and the called terminal device actively falls back to the LTE to receive an incoming call.

However, the abnormality in the network may mean that, for example, an abnormality occurs in an initial context setup process between a core network element (such as AMF) and the NR access network, which causes the core network to fail in sending the INVITE (or another IMS signaling) to the NR access network. As a result, the called terminal device cannot receive the INVITE. In this case, the SCC AS may retransmit the INVITE to the core network 3 times. However, due to abnormality in a transmission link between the core network and the access network, the core network still fails in sending the INVITE (or another IMS signaling) to the NR access network.

In a possible design, the called terminal device may actively fall back to the LTE to receive the incoming call when a preset condition is satisfied. The preset condition includes that the called terminal device does not open a preset application, the called terminal device does not enable a game mode or a performance mode, and/or the called terminal device is in a screen off state. The preset application may include an application requiring a high data transmission rate. The application may be, for example, a game application and a live streaming application.

It should be understood that, when the preset condition is satisfied, that is, when the preset application is not opened, the game mode or the performance mode is not enabled, and/or the called terminal device is in the screen off state, requirements on network quality and a data transmission rate are not high, and the called terminal device may camp on a low level network (such as a 4G network) to provide services to users. In this case, fallback from the 5G SA network to the 4G network (the LTE network) does not affect normal operation of the called terminal device, and can increase a call completion of the called terminal device. When the terminal device does not satisfy the preset condition, that is, when the terminal device opens the preset application, the terminal device enables the game mode or the performance mode, or the called terminal device is in a screen on state, requirements on the data transmission rate and the network quality are relatively high, and the called terminal device needs to camp on a higher level network (such as a 5G network) to provide smoother services to users. In this case, the called terminal device may not fall back to the LTE network, to avoid impact on the normal operation of the called terminal device.

510: The called terminal device actively falls back to the LTE network and start a timer T2 (a second timer), and attempts to receive the incoming call in an on period of the T2 timer.

If the called terminal device does not receive the INVITE or other IMS data from the IMS DRB in the on period of the timer T1, it is considered that the network is abnormal and therefore the INVITE or the other IMS data cannot be received. In this case, after the timer T1 expires, the called terminal device may actively fall back to the LTE to receive the incoming call. When the called terminal device falls back to the LTE, the timer T2 may be started. The called terminal device may receive the incoming call on the LTE in the on period of the timer T2.

511: Return to the NR network (a 5G SA network) after an incoming call ends if the incoming call is received in the on period of the time T2, and reduce a priority of a source NR cell (the source cell is an NR cell) after returning to the NR network.

The called terminal device may attempt to receive the incoming call on the LTE in the on period of the timer T2.

It should be noted that, the SCC AS may initiate a CS retry in the on period of the timer T2. The called terminal device may receive CS paging (paging) on the LTE and perform a circuit switched fallback (CSFB) process. In this way, the called terminal device can receive the incoming call in the CS domain in the on period of the timer T2, thereby avoiding a failed incoming call. Alternatively, the called terminal device can receive the INVITE message or the paging message from the IMS domain on the LTE, that is, the called terminal device can receive the incoming call in the IMS domain in the on period of the timer T2, thereby avoiding a failure.

A duration of the timer T2 may be configured based on a preset parameter. The preset parameter may include at least one of a parameter indicating that the called terminal device is in a screen on state or a screen off state, a network type of the called terminal device set by a user, a parameter indicating whether the called terminal device is connected to a Wi-Fi network, an operating mode of the called terminal device, a current traffic used by the called terminal device, and a number of applications simultaneously run on the called terminal device. The operating mode of the called terminal device may include a game mode, a performance mode, a smooth mode, and the like. After enabling the game mode, the called terminal device may configure incoming call kept in the background, intelligent allocation of more resources to games, automatically rejection of incoming calls, prohibiting automatic connection to a WLAN, control whether to display floating notifications within games (for example, a user may prohibit display of floating notifications during games), and the like. After the called terminal device enables the performance mode, hardware such as a CPU and a GPU can run without limitations, thereby reaching optimal performance. After the called terminal device enables the smooth mode, in the CPU, a dominant frequency is limited, so that power is saved, and an endurance time increases.

For example, when the timer T2 is started, if it is determined that the called terminal device is in the screen off state, a duration of the timer T2 may be set to a first duration. If the called terminal device is currently using a Wi-Fi network, the duration of timer T2 may be set to the first duration. If it is detected that a user turns on a 5G switch, the duration of timer T2 may be set to a second duration. If the called terminal device is currently running a plurality of applications simultaneously, the duration of timer T2 may be set to the second duration. If the called terminal device is currently in the game mode or the performance mode, the duration of timer T2 may be set to the second duration. The first duration is greater than the second duration. That is to say, when the timer T2 is started, if it is determined that the called terminal device is in the screen off state, or the called terminal device is currently using the Wi-Fi network, the duration of timer T2 may be set to be relatively long. When the timer T2 is started, if it is detected that the user turns on the 5G switch, or the called terminal device is currently running a plurality of applications simultaneously, or the called terminal device is currently in the game mode or the performance mode, the duration of timer T2 may to be set relatively short.

It should be noted that, when the called terminal device is in the screen off state, the called terminal device usually has few interactions with the network, and has low requirements on the network quality and the data transmission rate, and may camp on a low level network (such as the LTE network) for a long time. This does not affect normal operation of the called terminal device, and can increase a call completion of the called terminal device. When the called terminal device uses a Wi-Fi network, the called terminal device usually has few interactions with a mobile communication network, and may camp on a low level network (such as the LTE network) for a long time. This does not affect the normal operation of the called terminal device, and can increase the call completion of the called terminal device. When it is detected that the user turns on the 5G network switch, it indicates that the user prefers the called terminal device to camp on a 5G network. In this case, the called terminal device may camp on a low level network (such as the LTE network) for a relatively short time. This does not affect the normal operation of the called terminal device. When the called terminal device needs to consume a large amount of traffic of a mobile communication network, the called terminal device may camp on a low level network (such as a 4G network) for a relatively short time, but needs to return to a higher level network as soon as possible, so as to avoid impact on the normal operation of the called terminal device.

If the called terminal device receives the incoming call in the on period of the timer T2, it is considered that the fallback to the LTE implements effective answering of the incoming call. After the call ends, the called terminal device may actively return to the NR network. Optionally, the called terminal device may disable the timer T2 after receiving the incoming call, and actively return to the NR network after the call ends. Alternatively, the called terminal device may actively return to the NR network after the call ends and the timer T2 expires. The priority of a source NR cell may be reduced after the called terminal device returns to the NR network, to avoid a failed incoming call caused by network abnormalities occurred again in the access network and the core network.

The called terminal device receiving the incoming call in the on period of the timer T2 may include any one of the following cases: The called terminal device receives the paging message, the INVITE message, an SIP call setup message, and the like from the IMS domain in the on period of the timer T2, or the called terminal device receives a paging message, a CS service notification (CS_Service_Notification), and the like in the CS domain in the on period of the timer T2. This is not limited in this application.

512: Calculate a success rate of receiving the incoming call after the called terminal device falls back to the LTE. If the success rate is greater than a preset threshold, the called terminal device falls back to the LTE when the same situation subsequently occurs. If the success rate is less than the preset threshold, the called terminal device no longer falls back to the LTE when the same situation subsequently occurs.

The called terminal device may calculate the success rate of receiving the incoming call after falling back to the LTE within a period of time. When the success rate is greater than the preset threshold, the called terminal device falls back to the LTE when the same situation subsequently occurs (that is, the called terminal device starts the timer T1 when detecting that the DRB for transmitting the IMS data is established, but the called terminal device does not receive the IMS data in the on period of the timer T1), to avoid a failed incoming call. When the success rate is less than the preset threshold, the called terminal device no longer actively falls back to the LTE when the same situation subsequently occurs (that is, the called terminal device starts the timer T1 when detecting that the DRB for transmitting the IMS data is established, but the called terminal does not receive the IMS data in the on period of the timer T1).

In a possible design, the success rate of receiving the incoming call after the called terminal device falls back to the LTE for first N times (for example, 3, 5, or 10 times, which is not limited in this application) within each preset cycle (for example, one week or one month) is calculated, thereby preventing a case in which the called terminal device falls back to the LTE a plurality of times but ineffectively receives the incoming call within each preset cycle.

Alternatively, the success rate of receiving the incoming call after the called terminal device falls back to the LTE within the preset cycle (for example, a first preset cycle) may be calculated, thereby preventing a case in which the called terminal device falls back to the LTE again but ineffectively receives the incoming call within a next preset cycle (for example, a second preset cycle).

Figure 6:
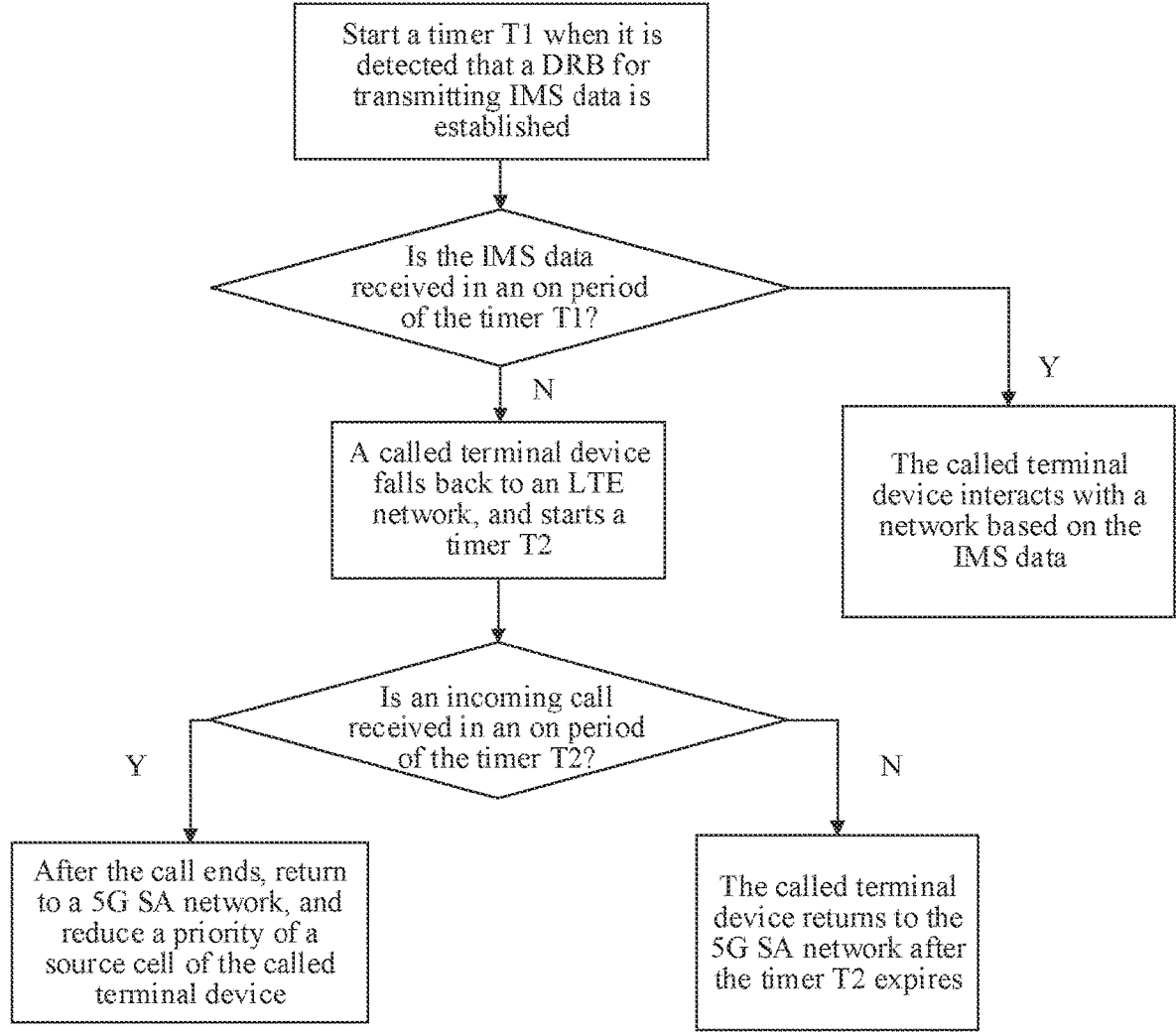
FIG. 6 is a schematic signal flowchart diagram according to an embodiment of this application.

As shown in FIG. 6, the called terminal device may start the timer T1 when detecting that the DRB for transmitting the IMS data is established, and detect whether the IMS data is received in the on period of the timer T1. When the timer T1 expires and the called terminal device does not receive the INVITE or other IMS data (for example, multimedia data such as an audio, a text, an image, and a video), it is considered that the network is abnormal and therefore the IMS data (such as the INVITE) cannot be received, and the called terminal device actively falls back to the LTE to receive the incoming call. If the timer T1 expires, that is, the called terminal device receives the data from the IMS DRB in the on period of the timer T1, and the received data is greater than a preset threshold, the timer T1 may be disabled. The called terminal device may interact with the network side based on the IMS data received from the IMS DRB. When the called terminal device falls back to the LTE, the timer T2 may be started. The called terminal device may receive the incoming call on the LTE in the on period of the timer T2. If the called terminal device receives the incoming call in the on period of the timer T2, it is considered that the fallback to the LTE implements effective answering of the incoming call. After the call ends, the called terminal device may actively return to the NR. A priority of a source NR cell may be reduced after the called terminal device returns to an NR network, to avoid a failed incoming call caused by network abnormalities occurred again in an access network and a core network.

In the method provided in this embodiment of this application, the called terminal device may start the timer T1 when detecting that the DRB for transmitting the IMS data is established, and detect whether the IMS data is received in the on period of the timer T1. If the timer T1 expires and the called terminal device does not receive the INVITE or other IMS data, it is considered that the network is abnormal and therefore the IMS data (such as the INVITE) cannot be received. In this case, the called terminal device may actively fall back to LTE to receive an incoming call. In this way, the called terminal device can receive the INVITE message or the paging message on the LTE, thereby avoiding a failed incoming call.

Further, When the called terminal device falls back to the LTE, the timer T2 may be started. The called terminal device may receive the incoming call on the LTE in the on period of the timer T2. If the called terminal device receives the incoming call in the on period of the timer T2, it is considered that the fallback to the LTE implements effective answering of the incoming call. After the call ends, the called terminal device may actively return to the NR. A priority of a source NR cell may be reduced after the called terminal device returns to an NR network, to avoid a failed incoming call caused by network abnormalities occurred again in an access network and a core network.

Figure 7A:
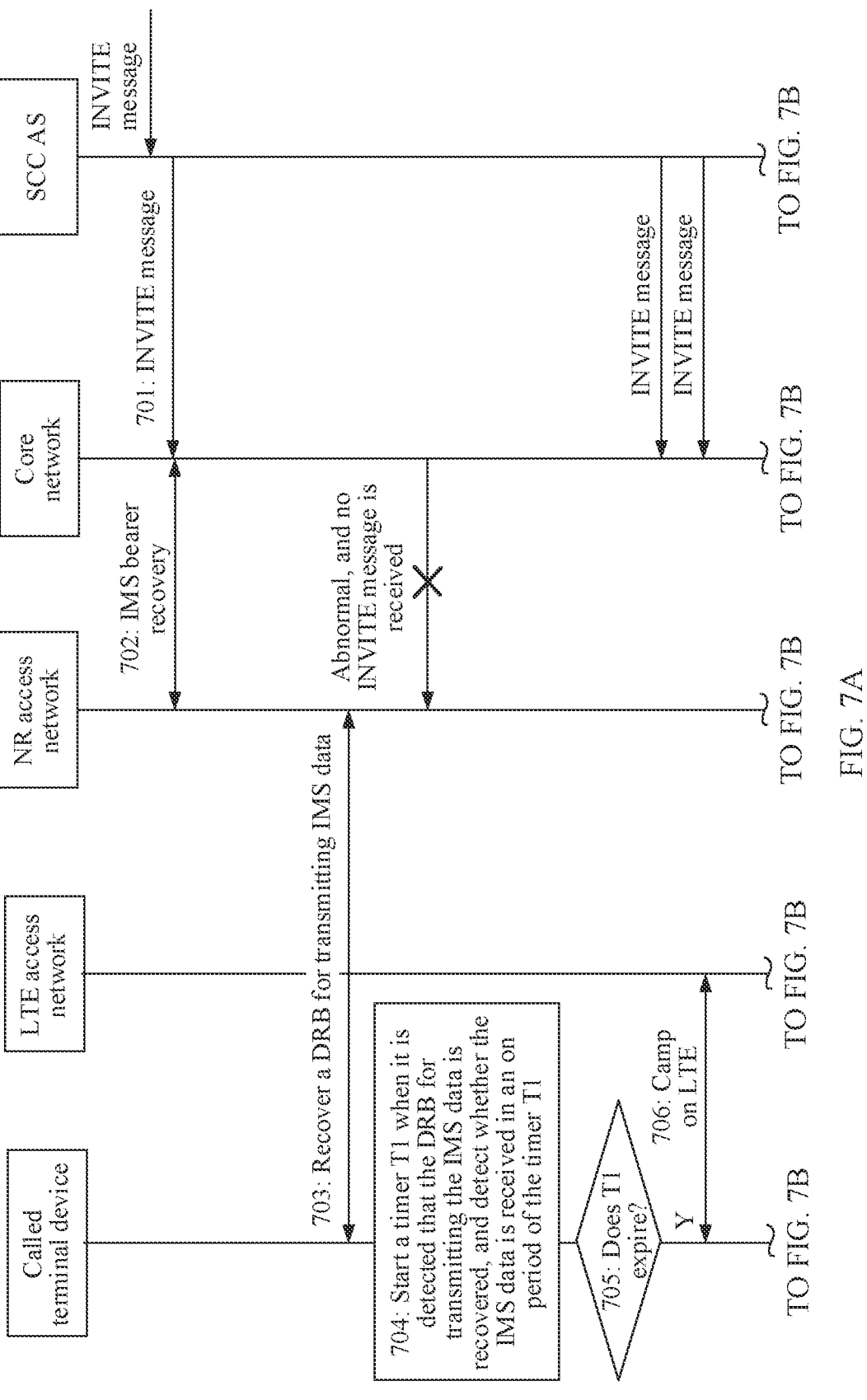
FIG. 7A and FIG. 7B are schematic signal exchange diagrams IV according to an embodiment of this application.
Figure 7B:
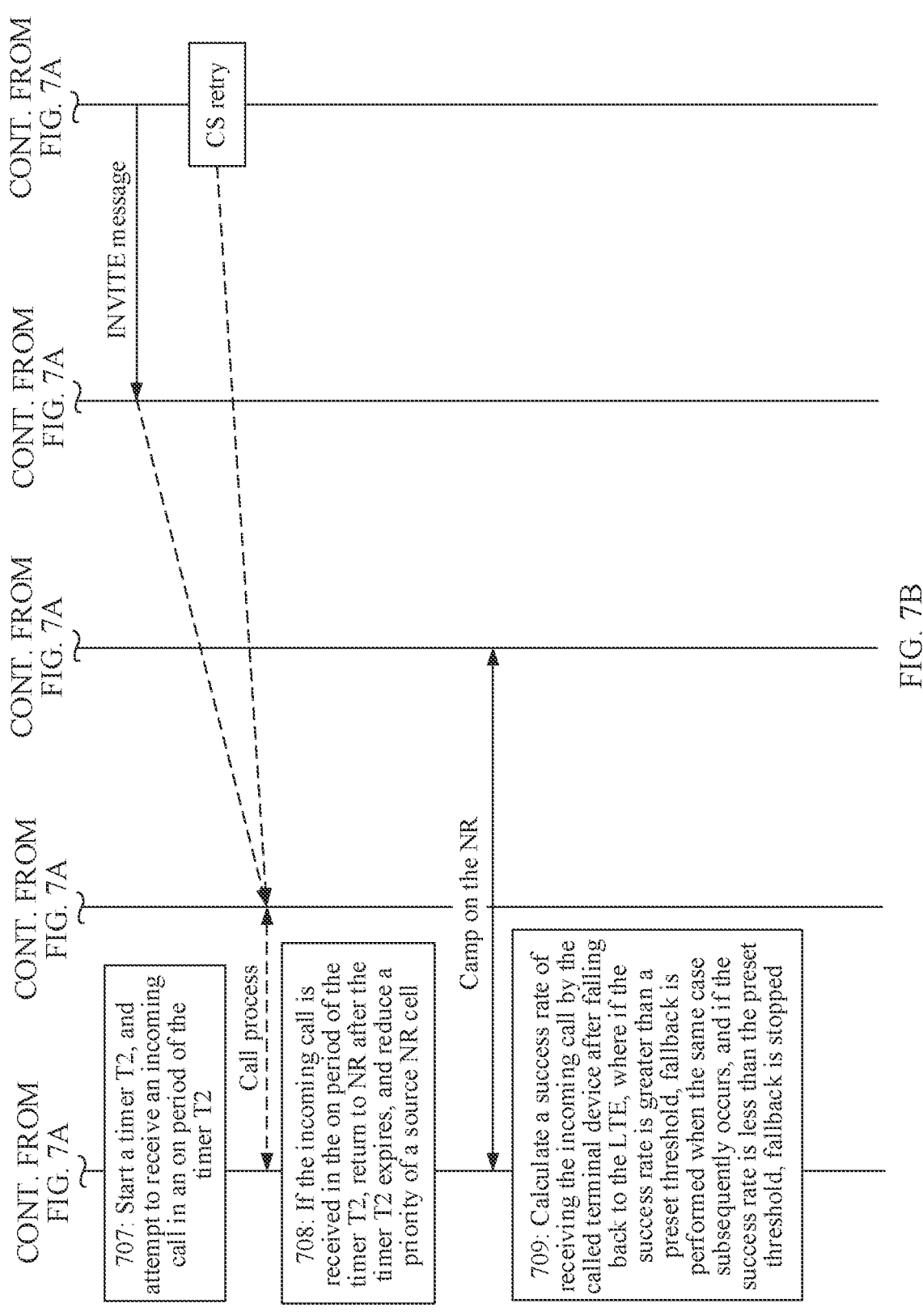

As shown in FIG. 7A and FIG. 7B, an embodiment of this application provides a paging method for a called terminal. A mobile phone is in a connected state, for example. The method includes the following steps:

701: An SCC AS receives an INVITE message and then sends the INVITE message to a core network.

For a related description, reference may be made to step 501, and details are not described herein.

702: The core network recovers an IMS bearer with an NR access network.

After the core network receives the INVITE message from the SCC AS, when it is determined that the called terminal device is in the connected state, the core network may recover the IMS bearer with the NR access network (for example, recover a bearer with a 5G quality of service (QOS) identifier (5G QOS identifier, 5QI) equal to 5).

703: The NR access network recovers an IMS DRB with a called terminal device.

After the core network recovers the IMS bearer with the NR access network, the NR access network may recover/establish a DRB for transmitting IMS data with the called terminal device.

704: The called terminal device starts a timer T1 when detecting that the DRB for transmitting the IMS data is recovered, and detects whether the IMS data is received in an on period of the timer T1.

If the called terminal device detects that the IMS DRB is recovered on the NR, it means that the network needs to transmit the IMS data to the called terminal device. In this case, the called terminal device may start the timer T1 and detect whether data is received from the IMS DRB in the on period of the timer T1.

705: Determine whether the timer T1 expires.

If the timer T1 expires, step 706 is performed.

If the timer T1 expires, that is, the called terminal device receives the data from the IMS DRB in the on period of the timer T1, and the received data is greater than a preset threshold, the timer T1 may be disabled. The called terminal device may interact with the network side based on the IMS data received from the IMS DRB.

706: When the timer T1 expires and the called terminal device does not receive INVITE or other IMS data (for example, multimedia data such as an audio, a text, an image, and a video), it is considered that the network is abnormal and therefore the IMS data (such as INVITE) cannot be received, and the called terminal device actively falls back to the LTE to receive an incoming call.

707: The called terminal device actively falls back to the LTE network and starts a timer T2, and attempts to receive the incoming call in an on period of the T2 timer.

708: If the incoming call is received in the on period of the timer T2, return to the NR after the timer T2 expires, and reduce a priority of a source NR cell when returning to the NR.

709: Calculate a success rate of receiving the incoming call after the called terminal device falls back to the LTE. If the success rate is greater than a preset threshold, the called terminal device falls back to the LTE when the same situation subsequently occurs. If the success rate is less than the preset threshold, the called terminal device no longer falls back to the LTE when the same situation subsequently occurs.

For related descriptions of step 706 to step 709, reference may be made to the descriptions of step 509 to step 512, and the details are not described herein.

In the method provided in this embodiment of this application, the called terminal device may start the timer T1 when detecting that the DRB for transmitting the IMS data is recovered, and detect whether the IMS data is received in the on period of the timer T1. If the timer T1 expires and therefore the called terminal device does not receive INVITE or other IMS data, it is considered that the network is abnormal and the IMS data (such as INVITE) cannot be received. In this case, the called terminal device may actively fall back to LTE to receive an incoming call. In this way, the called terminal device can receive an INVITE message or a paging message in an IMS domain on the LTE, thereby avoiding a failed incoming call.

Further, When the called terminal device falls back to the LTE, the timer T2 may be started. The called terminal device may receive the incoming call on the LTE in the on period of the timer T2. If the called terminal device receives the incoming call in the on period of the timer T2, it is considered that the fallback to the LTE implements effective answering of the incoming call. After the call ends, the called terminal device may actively return to the NR. A priority of a source NR cell may be reduced after the called terminal device returns to an NR network, to avoid a failed incoming call caused by network abnormalities occurred again in an access network and a core network.

Figure 8:
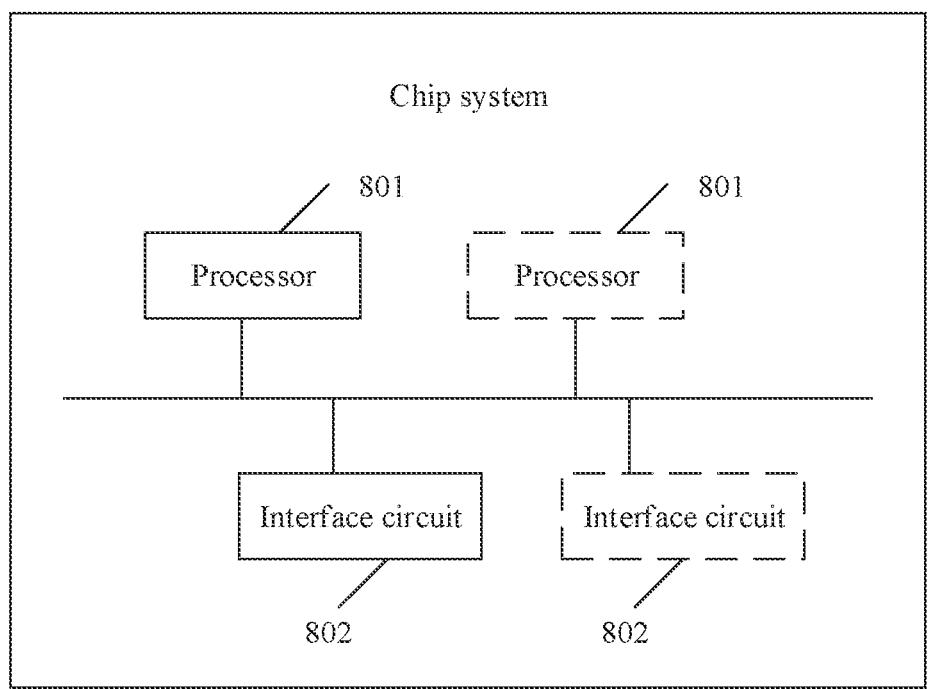
FIG. 8 is a schematic structural diagram of a chip system according to an embodiment of this application.

An embodiment of this application further provides a chip system. As shown in FIG. 8, the chip system includes at least one processor 801 and at least one interface circuit 802. The processor 801 and the interface circuit 802 may be connected to each other through a line. In an example, the interface circuit 802 may be configured to receive a signal from another apparatus (for example, a memory of an electronic device). For another example, the interface circuit 802 may be configured to send a signal to another apparatus (for example, the processor 801).

For example, the interface circuit 802 may read instructions stored in the memory in the electronic device and send the instructions to the processor 801. When instructions are executed by the processor 801, a terminal device (such as the terminal device 100 shown in FIG. 4) may be caused to perform all of the steps in the foregoing embodiments.

Certainly, the chip system may further include another discrete device. This is not specifically limited in this embodiment of this application.

An embodiment of this application further provides a computer-readable storage medium. The computer-readable storage medium includes computer instructions. When the computer instructions are run on a terminal device (such as the terminal device 100 shown in FIG. 4), the terminal device 100 is caused to implement the functions or steps performed by the caller terminal device or the called terminal device in the foregoing method embodiments.

An embodiment of this application further provides a computer program product. When the computer program product is run on a computer, the computer is caused to perform the functions or steps performed by the electronic device in the foregoing method embodiments.

An embodiment of this application further provides a voice calling apparatus, which may be divided into different logical units or modules according to functions. Each unit or module performs a different function to cause the apparatus to perform the functions or steps executed by the electronic device in the foregoing method embodiments.

The foregoing descriptions about implementations allow a person skilled in the art to understand that, for convenience and conciseness of description, division of the foregoing functional modules is taken as an example for illustration. In actual application, the foregoing functions may be assigned to different functional modules for completion as required.

In other words, an internal structure of the apparatus is divided into different functional modules to implement all or some of the functions described above. For a specific working process of the system, apparatus, and unit described above, refer to a corresponding process in the foregoing method embodiments, and the details are not described herein.

In the plurality of embodiments provided in this embodiment, it should be understood that the disclosed system, apparatus, and method may be implemented in another manner. For example, the described apparatus embodiment is merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate components may or may not be physically separated, and the components displayed as units may or may not be physical units, and may be located in one place or may be distributed over a plurality of network units. Some or all of the units may be selected based on actual requirements to achieve the objectives of the solutions of embodiments.

In addition, functional units in the embodiments of this embodiment may be integrated into one processing unit, or each of the units may exist alone physically, or two or more units are integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments essentially, or the part contributing to the related art, or all or some of the technical solutions may be implemented in the form of a software product. The computer software product is stored in a storage medium and includes a plurality of instructions for instructing a computer device (which may be a personal computer, a server, a network device, or the like) or a processor to perform all or some of the steps of the methods described in the embodiments. The storage medium includes any medium that can store program code, such as a flash memory, a removable hard disk, a read-only memory, a random access memory, a magnetic disc, or a compact disc.

The foregoing descriptions are merely specific embodiments of this application, and are not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. A paging method, comprising:

receiving, by a called terminal device, a paging message, wherein the called terminal device camps on a 5th generation mobile communication system standalone (5G SA) network;

starting, by the called terminal device, a first timer based on detecting that a data radio bearer (DRB) for transmitting internet protocol multimedia subsystem (IMS)

data is established, and detecting whether the IMS data is received in an on period of the first timer;

performing, by the called terminal device, fallback to a long term evolution (LTE) network to receive an incoming call based on the first timer expiring and the called terminal device not receiving the IMS data in the on period of the first timer;

starting a second timer and receiving the incoming call in an on period of the second timer after the called terminal device falls back to the LTE network; and based on the incoming call being received in the on period of the second timer, returning to the 5G SA network.

2. The method according to claim 1, wherein the receiving the incoming call in the on period of the second timer comprises:

receiving, by the called terminal device, any one of a paging message, an invitation (INVITE) message, or a session initiation protocol (SIP) call establishment message in an IMS domain in the on period of the second timer; or receiving, by the called terminal device, any one of a paging message or a circuit switching (CS) service notification message of a CS domain in the on period of the second timer.

3. The method according to claim 2, further comprising:

executing a circuit switched fallback (CSFB) process to switch to the CS domain after the called terminal device receives the paging message on the LTE network.

4. The method according to claim 1, further comprising:

calculating, by the called terminal device, a success rate of receiving the incoming call after falling back to the LTE for first N times within each preset cycle;

performing, by the called terminal device, fallback to the LTE network to receive the incoming call based on the success rate being greater than or equal to a preset threshold and the called terminal device not receiving the IMS data of the called terminal device when the first timer expires again; and skipping performing, by the called terminal device, fallback to the LTE network to receive the incoming call based on the success rate being less than the preset threshold and the called terminal device not receiving the IMS data of the called terminal device when the first timer expires again.

5. The method according to claim 1, wherein the performing, by the called terminal device, the fallback to the LTE network to receive the incoming call comprises:

performing, by the called terminal device, the fallback to the LTE network to receive the incoming call based on a preset condition being satisfied, wherein the preset condition comprises that the called terminal device does not open a preset application, the called terminal device does not enable a game mode or a performance mode, and/or the called terminal device is in a screen off state.

6. The method according to claim 1, wherein in the on period of the first timer, the called terminal device disables the first timer based on receiving the IMS data of the called terminal device in the on period of the first timer.

7. The method according to claim 1, wherein a duration of the second timer is configurable based on a preset parameter; and wherein the preset parameter comprises at least one of: a parameter indicating that the called terminal device is in a screen on state or a screen off state, a network type of the called terminal device, a parameter indicating whether the called terminal device is connected to a wireless fidelity (Wi-Fi) network, an operating mode of the called terminal device, a current traffic used by the called terminal device, or a number of applications simultaneously run on the called terminal device.

8. The method according to claim 1, further comprising:

based on the incoming call being received in the on period of the second timer, returning to the 5G SA network and reducing a priority of a New Radio (NR) source cell of the called terminal device after the incoming call ends.

9. A chip system, comprising:

one or more interface circuits; and one or more processors, wherein the one or more interface circuits and the one or more processors are connected to each other through lines;

wherein the chip system is applicable to a called terminal device comprising a communication device and a memory, wherein the one or more interface circuits are configured to receive signals from the memory and send the signals to the one or more processors, wherein the signals comprise computer instructions stored in the memory, and when the one or more processors execute the computer instructions, the called terminal device is configured to perform:

receiving a paging message, wherein the called terminal device camps on a 5th generation mobile communication system standalone (5G SA) network;

starting a first timer based on detecting that a data radio bearer (DRB) for transmitting internet protocol multimedia subsystem (IMS) data is established, and detecting whether the IMS data is received in an on period of the first timer;

performing fallback to a long term evolution (LTE) network to receive an incoming call based on the first timer expiring and the called terminal device not receiving the IMS data in the on period of the first timer;

starting a second timer and receiving the incoming call in an on period of the second timer after the called terminal device falls back to the LTE network; and based on the incoming call being received in the on period of the second timer, returning to the 5G SA network.

10. The chip system according to claim 9, wherein when the one or more processors execute the computer instructions, the called terminal device is further configured to perform:

based on the incoming call being received in the on period of the second timer, returning to the 5G SA network and reducing a priority of a New Radio (NR) source cell of the called terminal device after the incoming call ends.

11. The chip system according to claim 9, wherein the receiving the incoming call in the on period of the second timer comprises:

receiving any one of a paging message, an invitation (INVITE) message, or a session initiation protocol (SIP) call establishment message in an IMS domain in the on period of the second timer; or receiving any one of a paging message or a circuit switching (CS) service notification message of a CS domain in the on period of the second timer.

12. The chip system according to claim 11, wherein when the one or more processors execute the computer instructions, the called terminal device is further configured to perform:

executing a circuit switched fallback (CSFB) process to switch to the CS domain after the called terminal device receives the paging message on the LTE network.

13. The chip system according to claim 9, wherein when the one or more processors execute the computer instructions, the called terminal device is further configured to perform:

calculating a success rate of receiving the incoming call after falling back to the LTE for first N times within each preset cycle;

performing fallback to the LTE network to receive the incoming call based on the success rate being greater than or equal to a preset threshold and the called terminal device not receiving the IMS data of the called terminal device when the first timer expires again; and skipping performing fallback to the LTE network to receive the incoming call based on the success rate being less than the preset threshold and the called terminal device not receiving the IMS data of the called terminal device when the first timer expires again.

14. The chip system according to claim 9, wherein the performing the fallback to the LTE network to receive the incoming call comprises:

performing the fallback to the LTE network to receive the incoming call based on a preset condition being satisfied, wherein the preset condition comprises that the called terminal device does not open a preset application, the called terminal device does not enable a game mode or a performance mode, and/or the called terminal device is in a screen off state.

15. The chip system according to claim 9, wherein when the one or more processors execute the computer instructions, the called terminal device is further configured to perform:

disabling the first timer based on receiving the IMS data of the called terminal device in the on period of the first timer.

16. The chip system according to claim 9, wherein a duration of the second timer is configurable based on a preset parameter; and wherein the preset parameter comprises at least one of: a parameter indicating that the called terminal device is in a screen on state or a screen off state, a network type of the called terminal device, a parameter indicating whether the called terminal device is connected to a wireless fidelity (Wi-Fi) network, an operating mode of the called terminal device, a current traffic used by the called terminal device, or a number of applications simultaneously run on the called terminal device.

17. An terminal device, comprising:

a memory storing program instructions; and a processor coupled to the memory, wherein when the program instructions are executed by the processor, the terminal device is enabled to perform operations comprising:

receiving a paging message, wherein the terminal device camps on a 5th generation mobile communication system standalone (5G SA) network;

starting a first timer based on detecting that a data radio bearer (DRB) for transmitting internet protocol multimedia subsystem (IMS) data is established, and detecting whether the IMS data is received in an on period of the first timer;

performing fallback to a long term evolution (LTE) network to receive an incoming call based on the first timer expiring and the terminal device not receiving the IMS data in the on period of the first timer;

starting a second timer and receiving the incoming call in an on period of the second timer after the terminal device falls back to the LTE network; and based on the incoming call being received in the on period of the second timer, returning to the 5G SA network.

18. The terminal device according to claim 17, wherein the receiving the incoming call in the on period of the second timer comprises:

receiving, by the terminal device, any one of a paging message, an invitation (INVITE) message, or a session initiation protocol (SIP) call establishment message in an IMS domain in the on period of the second timer; or receiving, by the terminal device, any one of a paging message or a circuit switching (CS) service notification message of a CS domain in the on period of the second timer.

19. The terminal device according to claim 18, wherein when the program instructions are executed by the processor, the terminal device is further enabled to perform operations comprising:

executing a circuit switched fallback (CSFB) process to switch to the CS domain after the terminal device receives the paging message on the LTE network.

20. The terminal device according to claim 17, wherein a duration of the second timer is configurable based on a preset parameter; and wherein the preset parameter comprises at least one of: a parameter indicating that the terminal device is in a screen on state or a screen off state, a network type of the terminal device, a parameter indicating whether the terminal device is connected to a wireless fidelity (Wi-Fi) network, an operating mode of the terminal device, a current traffic used by the terminal device, or a number of applications simultaneously run on the terminal device.

* * * * *